(12) United States Patent
Callemo et al.

(10) Patent No.: US 11,067,296 B2
(45) Date of Patent: Jul. 20, 2021

(54) HEAT PUMP SYSTEM AND METHOD FOR CONTROLLING A HEAT PUMP SYSTEM

(71) Applicant: SENS Geoenergy Storage AB, Nacka (SE)

(72) Inventors: David Callemo, Sollentuna (SE); Jan Thorburn, Saltsjö-duvnäs (SE)

(73) Assignee: SENS GEOENERGY STORAGE AB, Nacka (SR)

( * ) Notice: Subject to any disclaimer, the term of this patent is extended or adjusted under 35 U.S.C. 154(b) by 402 days.

(21) Appl. No.: 15/777,191

(22) PCT Filed: Nov. 17, 2016

(86) PCT No.: PCT/SE2016/051142
§ 371 (c)(1),
(2) Date: May 17, 2018

(87) PCT Pub. No.: WO2017/086870
PCT Pub. Date: May 26, 2017

(65) Prior Publication Data
US 2020/0263881 A1 Aug. 20, 2020

(30) Foreign Application Priority Data
Nov. 20, 2015 (SE) .................................... 1551509-1

(51) Int. Cl.
*F24D 19/10* (2006.01)
*F24D 3/08* (2006.01)
(Continued)

(52) U.S. Cl.
CPC ......... *F24D 19/1087* (2013.01); *F24D 3/082* (2013.01); *F24D 3/18* (2013.01);
(Continued)

(58) Field of Classification Search
CPC ........ F24D 15/04; F24D 2200/32; F24D 3/18; F24D 3/082; F24D 3/02; F24D 3/087;
(Continued)

(56) References Cited

U.S. PATENT DOCUMENTS 2,396,338 A * 3/1946 Newton ................ F24F 5/0003
165/236
2,780,415 A 2/1957 Frazer
(Continued)

FOREIGN PATENT DOCUMENTS

EP 0952386 A2 10/1999
GB 2346674 A 8/2000
(Continued)

OTHER PUBLICATIONS

International Search Report and Written Opinion from corresponding International Application No. PCT/SE2016/051142, dated Feb. 24, 2017; 15 pages.
(Continued)

*Primary Examiner* — Daniel E. Namay
(74) *Attorney, Agent, or Firm* — Tucker Ellis LLP

(57) ABSTRACT

Heat pump system (100) comprising at least one heat medium circuit (210,220,230,240,250,310,320,410,420, 430,440,450,460) in turn comprising a compressor (211), an expansion valve (232,242), at least two different primary heat sources or sinks selected from outdoor air, a water body, the ground or exhaust air, at least one of two different secondary heat sources or sinks selected from indoors air, pool water and tap water, a respective temperature sensor (412,432) at each of said primary heat sources or sinks, a valve means (421,431,451) for selectively directing the primary-side heat medium to at least one of said primary heat exchanging means, and a control means (500). The invention is characterised in that, in a secondary-side heat-
(Continued)

ing operating mode, the temperature of said primary heat sources or sinks is measured, and in that the primary-side heat medium is directed only to available primary heat exchanging means associated with the heat sources or sinks with the highest temperature. The invention also relates to a method.

21 Claims, 4 Drawing Sheets

(51) Int. Cl.
  *F25B 25/00* (2006.01)
  *F25B 30/06* (2006.01)
  *F24D 3/18* (2006.01)
  *F25B 13/00* (2006.01)
  *F24D 11/02* (2006.01)
  *F25B 49/02* (2006.01)
  *F24F 11/86* (2018.01)
  *F24D 15/04* (2006.01)
  *F24F 5/00* (2006.01)
  *F25B 30/02* (2006.01)

(52) U.S. Cl.
  CPC .............. *F24D 11/02* (2013.01); *F24D 15/04* (2013.01); *F24D 19/1039* (2013.01); *F24D 19/1072* (2013.01); *F24F 5/0046* (2013.01); *F24F 11/86* (2018.01); *F25B 13/00* (2013.01); *F25B 25/005* (2013.01); *F25B 30/02* (2013.01); *F25B 30/06* (2013.01); *F25B 49/02* (2013.01); *F24D 2200/11* (2013.01); *F24D 2200/12* (2013.01); *F24D 2200/123* (2013.01); *F24D 2200/31* (2013.01); *F24D 2200/32* (2013.01); *F25B 2313/0233* (2013.01); *F25B 2313/0253* (2013.01); *F25B 2339/047* (2013.01); *F25B 2500/222* (2013.01); *F25B 2700/2103* (2013.01); *Y02B 10/40* (2013.01); *Y02B 10/70* (2013.01); *Y02B 30/12* (2013.01); *Y02B 30/52* (2013.01)

(58) Field of Classification Search
  CPC ... F24D 3/08; F24D 3/10; F24D 11/02; F24D 11/0214; F24D 19/1039; F24D 19/1072; F24D 19/1087; F24D 2200/11; F24D 2200/123; F24D 12/02; F24F 11/86; F25B 25/005; F25B 30/02; F25B 49/02; F25B 2313/0233; F25B 2313/0253; F25B 2339/047; F25B 2500/222; F25B 2700/2103
  USPC .................................................. 237/2 B, 8 A
  See application file for complete search history.

(56) References Cited

U.S. PATENT DOCUMENTS

| | | | | |
|---|---|---|---|---|
| 4,065,938 A * | 1/1978 | Jonsson | ................... | F24F 3/001 237/2 B |
| 4,209,996 A * | 7/1980 | Shaw | ................... | F24D 11/0221 62/175 |
| 4,242,872 A * | 1/1981 | Shaw | ................... | F24D 11/0264 62/235.1 |
| 4,375,831 A * | 3/1983 | Downing, Jr. | ....... | F24D 11/0214 165/48.1 |
| 4,493,193 A * | 1/1985 | Fisher | ................. | F24D 11/0214 62/160 |
| 4,507,936 A * | 4/1985 | Yoshino | .............. | F24D 11/0221 62/235.1 |
| 4,538,418 A * | 9/1985 | Lawrence | ................. | F24D 5/12 62/79 |
| 4,553,401 A * | 11/1985 | Fisher | ................. | F24D 11/0214 62/160 |
| 4,575,001 A * | 3/1986 | Oskarsson | ................ | F24D 3/18 237/2 B |
| 4,706,883 A * | 11/1987 | Fleischmann | ............. | F24D 3/18 237/2 B |
| 4,972,679 A * | 11/1990 | Petty | ....................... | F25B 33/00 62/238.3 |
| 5,081,846 A | 1/1992 | Dudley et al. | | |
| 5,095,715 A * | 3/1992 | Dudley | ................... | F24D 17/02 237/2 B |
| 5,195,328 A * | 3/1993 | Davis | ...................... | F24D 15/04 62/117 |
| 5,218,844 A * | 6/1993 | Nishiguchi | ........... | F25B 15/008 62/476 |
| RE34,747 E * | 10/1994 | Petty | ..................... | F25B 15/008 62/238.3 |
| 5,906,104 A * | 5/1999 | Schwartz | ............... | F24F 5/0071 237/2 B |
| 7,155,922 B2 * | 1/2007 | Harmon | ................ | F24F 5/0096 62/238.7 |
| 8,011,598 B2 * | 9/2011 | Kelly | ...................... | F24D 12/02 237/12.1 |
| 8,245,948 B2 * | 8/2012 | Cho | ......................... | F25B 27/02 237/12.1 |
| 8,726,682 B1 | 5/2014 | Olson | | |
| 9,316,402 B2 * | 4/2016 | Noh | ...................... | F24D 19/1063 |
| 9,389,000 B2 * | 7/2016 | Leete | ........................ | F25B 5/04 |
| 9,797,611 B2 * | 10/2017 | Gault | ................... | F24D 19/1087 |
| 9,879,881 B2 * | 1/2018 | Hawkins | ................ | F24D 17/02 |
| 9,945,582 B2 * | 4/2018 | Leete | ............................. | F24H 6/00 |
| 10,535,245 B2 * | 1/2020 | Callemo | ............. | F24D 19/1072 |
| 2002/0108745 A1 * | 8/2002 | Kimura | ............... | F28D 20/0056 165/236 |
| 2004/0200905 A1 * | 10/2004 | Saitoh | ..................... | F24D 17/02 237/19 |
| 2007/0246555 A1 * | 10/2007 | Nishimura | .......... | F24D 11/0214 237/2 B |
| 2008/0022707 A1 * | 1/2008 | Cho | ......................... | F25B 27/02 62/238.1 |
| 2008/0022708 A1 * | 1/2008 | Cho | ......................... | F25B 13/00 62/238.7 |
| 2008/0023961 A1 * | 1/2008 | Cho | ......................... | F25B 27/02 290/2 |
| 2009/0223509 A1 * | 9/2009 | Hoellenriegel | ..... | F24D 11/0221 126/643 |
| 2010/0223171 A1 | 9/2010 | Baller | | |
| 2011/0259024 A1 * | 10/2011 | Park | ...................... | F25B 7/00 62/160 |
| 2011/0259025 A1 * | 10/2011 | Noh | ..................... | F24F 1/0003 62/160 |
| 2011/0259027 A1 * | 10/2011 | Choi | ..................... | F24F 1/0003 62/196.1 |
| 2011/0272117 A1 | 11/2011 | Greensleeves | | |
| 2011/0283726 A1 * | 11/2011 | Sim | .......................... | F24D 17/02 62/160 |
| 2012/0018129 A1 * | 1/2012 | Ushijima | ................... | F24D 3/18 165/104.19 |
| 2012/0042673 A1 * | 2/2012 | Noh | ....................... | F24D 3/08 62/159 |
| 2012/0043390 A1 * | 2/2012 | Noh | ....................... | F24D 3/08 237/2 A |
| 2012/0102991 A1 * | 5/2012 | Lee | ........................ | F25B 13/00 62/160 |
| 2013/0104574 A1 * | 5/2013 | Dempsey | .............. | F24D 17/02 62/79 |
| 2014/0020637 A1 * | 1/2014 | Yamin | ..................... | F24D 15/04 122/32 |
| 2014/0260358 A1 * | 9/2014 | Leete | ................... | F24D 19/1054 62/79 |
| 2014/0260392 A1 * | 9/2014 | Hawkins | ............... | F25B 13/00 62/238.6 |
| 2014/0291411 A1 | 10/2014 | Tamaki et al. | | |
| 2014/0326004 A1 * | 11/2014 | Leman | ..................... | F24H 4/04 62/79 |

(56) References Cited

U.S. PATENT DOCUMENTS

| | | | | |
|---|---|---|---|---|
| 2015/0040841 A1* | 2/2015 | Leman | .................... | F24D 15/04 |
| | | | | 122/14.3 |
| 2015/0135744 A1* | 5/2015 | Gault | ........................ | F24D 5/12 |
| | | | | 62/115 |
| 2016/0320093 A1* | 11/2016 | Leete | ........................ | F24H 6/00 |
| 2018/0252434 A1* | 9/2018 | Hawkins | .................... | F25B 5/04 |
| 2018/0328598 A1* | 11/2018 | Callemo | ............... | F25B 49/022 |
| 2018/0335219 A1* | 11/2018 | Callemo | ............... | F25B 25/005 |
| 2018/0336775 A1* | 11/2018 | Callemo | ................. | F25B 30/02 |

FOREIGN PATENT DOCUMENTS

| | | | |
|---|---|---|---|
| GB | 2505655 A | 3/2014 |
| JP | 2011094885 A | 5/2011 |
| WO | 2013140954 A1 | 9/2013 |

OTHER PUBLICATIONS

International Preliminary Report on Patentability from corresponding International Application No. PCT/SE2016/051142, dated Feb. 1 2018; 15 pages.

* cited by examiner

HEAT PUMP SYSTEM AND METHOD FOR CONTROLLING A HEAT PUMP SYSTEM

The present invention relates to methods and systems for heat pumping. In particular, it relates to such methods and systems in which one or several primary heat sources or sinks are interconnected to one or several secondary heat sources or sinks, so as to provide flexible and responsive heating and/or cooling of a construction.

There are many known solutions for providing heat and/or cold to a building using heat pumping. For instance, bore holes, earth or a water bodies can be used to provide a heat carrier with stable temperature, which heat carrier can be used to heat water or indoors air, or to cool indoors air, using heat pumping. Similarly, outdoors air can be used to heat or cool a heat carrier, which heat carrier can then be used, via heat pumping, to heat water or indoors air, or to cool indoors air. Such heat pumping provides efficient heating or cooling, which is well known in the art.

Heat pumping as such has also been described extensively in the prior art. For instance, reversible heat pumps are known, as are heat pumps of different types.

One such example is a liquid-liquid heat pump, arranged to, via an internal heat medium loop, transfer thermal energy from one liquid to another liquid. Another example is an air-liquid heat pump, arranged to, via a similar internal heat medium loop, transfer thermal energy from air to a liquid or vice versa.

It is further known to "charge" an energy storage used for cooling with cold by heat exchanging between cold outdoors air and the energy storage.

A problem when designing a heat pump system for a building is that the heating and/or cooling requirements typically fluctuate heavily across the year, and even over a single day. For instance, during the summer in temperate climates the need for heating may be close to zero, while the need for heating during the winter may be substantial. Similarly, the need for cooling may be intermittent during the summer in such climates, while an outdoor pool may simultaneously need heating. Further, the need for hot tap water may vary depending on the time of day.

Hence, the required maximum capacity of a heat pumping system is typically much higher than an average requirement of the system. This can, for instance, be solved using an accumulation tank, for instance the hot tap water tank. This is problematic, since such tank needs to be large in order to be of sufficient capacity, and since there are thermal loss associated with such storage of thermal energy. Also, it may be complicated or cost-inefficient to transform the stored energy into suitable heating of indoors air or pool water, whereas the need for cooling is not easily met. Also, in case the conditions for heat production are attractive, the accumulation tank only accepts a certain amount of thermal energy before its temperature reaches its maximum allowed value. For instance, hot tap water can be only 100° C. hot.

Another solution that has been proposed is to use a heat pump with less than the maximum required capacity, and to supplement it with an electrical heating device which can be activated together with the heat pump in order to reach the highest production powers required for the building in question.

Such electrical heating is expensive, and is also a less attractive solution from an environmental point of view, as compared to using heat pumping. However, an over-dimensioned heat pump is also expensive and may not perform at maximum efficiency at the relatively low power required in most situations.

Furthermore, there is a problem with geothermal bore holes being cooled down during the summer, due to excess heating of houses, leading to the ground in general becoming cooler over time, in particular at sites with many such bore holes. This, in turn, leads to decreased heating efficiency using such geothermal heating systems.

Hence, there is a need for a flexible and simple heat pump system which can optimally distribute thermal energy between a building and its environment at high average efficiency.

There is also a need to monitor a heat pump system in a more cost-efficient manner than what is the case with conventional heat pump systems. In particular, heat pump systems can become quite complex, with numerous valves and other components. It is often difficult to detect damage to such components without performing a regular inspection. It would be desirable to automate such inspection, with the aim of detecting component damage at an early point before more severe damage results.

The present invention solves the above described problems.

Hence, the invention relates to a heat pump system comprising at least one heat medium circuit in turn comprising a compressor, an expansion valve, at least two primary heat exchanging means arranged to transfer thermal energy between a primary-side heat medium and at least one of two different primary heat sources or sinks selected from outdoor air, a water body, the ground or exhaust air, at least one secondary heat exchanging means, arranged to transfer thermal energy between a secondary-side heat medium and at least one of two different secondary heat sources or sinks selected from indoors air, pool water, tap water and a topmost ground layer, a respective temperature sensor arranged to measure the temperature of each of said primary heat sources or sinks, a valve means arranged to selectively direct the primary-side heat medium to at least one of said primary heat exchanging means, and a control means arranged to control said valve means, which system is characterised in that the control means is arranged to, in a secondary-side heating operating mode, measure the temperature of said primary heat sources or sinks, and to control the valve means to selectively direct the primary-side heat medium to only the primary heat exchanging means that is available for providing heat to the heat pump circuit and that is associated with the heat source or sink with the highest temperature, or to several of said primary heat exchanging means that are available for providing heat to the heat pump circuit and that are associated with the respective heat sources or sinks with the highest temperatures.

The invention also relates to a method for controlling a heat pump system comprising a heat medium circuit in turn comprising a compressor, an expansion valve, at least two primary heat exchanging means arranged to transfer thermal energy between a primary-side heat medium and at least one of two different primary heat sources or sinks selected from outdoor air, a water body or the ground, at least one secondary heat exchanging means arranged to transfer thermal energy between a secondary-side heat medium and at least one of two different secondary heat sources or sinks selected from indoors air, pool water, tap water and a topmost ground layer, a respective temperature sensor arranged to measure the temperature of each of said primary heat sources or sinks, a valve means arranged to selectively direct the primary-side heat medium to at least one of said primary heat exchanging means, and a control means arranged to control said valve means, which method is characterised in that the method comprises a step in which the control means measures the temperature of said secondary heat sources or sinks, and in that the method further comprises a step, in a secondary-side heating operating mode, in which the control means controls the valve means to selectively direct the primary-side heat medium to only the primary heat exchanging means that is available for providing heat to the heat pump circuit and that is associated with the heat source or sink with the highest temperature, or to several of said primary heat exchanging means that are available for providing heat to the heat pump circuit and that are associated with the heat source or sink with the highest temperatures.

In the following, the invention will be described in detail, with reference to exemplifying embodiments of the invention and to the enclosed drawings, wherein.

All FIGS. share the same reference numerals for the same or corresponding parts.

Figure 1A:
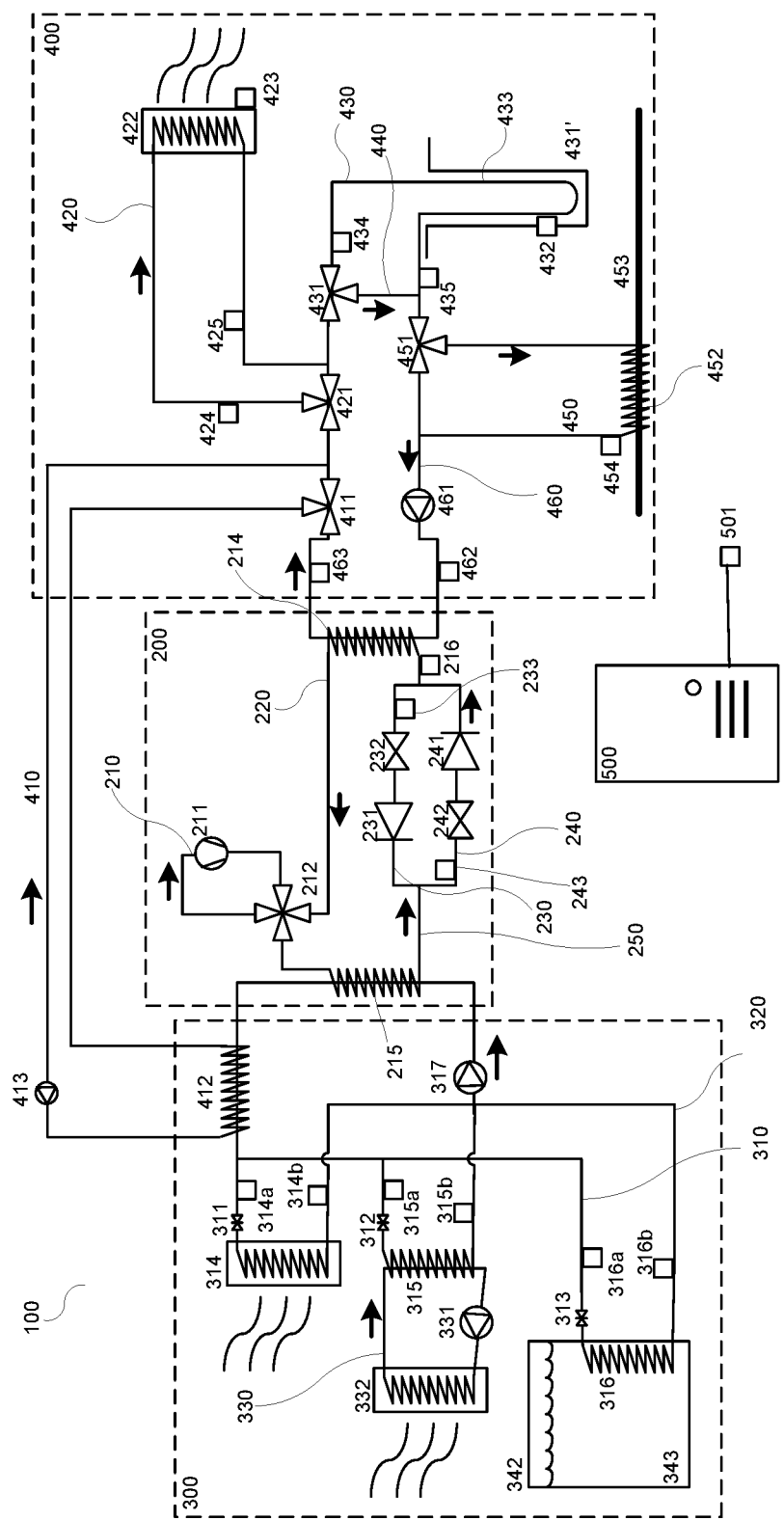
FIG. 1a is an overview diagram of a heat pump system according to a first embodiment of the invention showing circulation in a first circulation pattern.
Figure 1B:
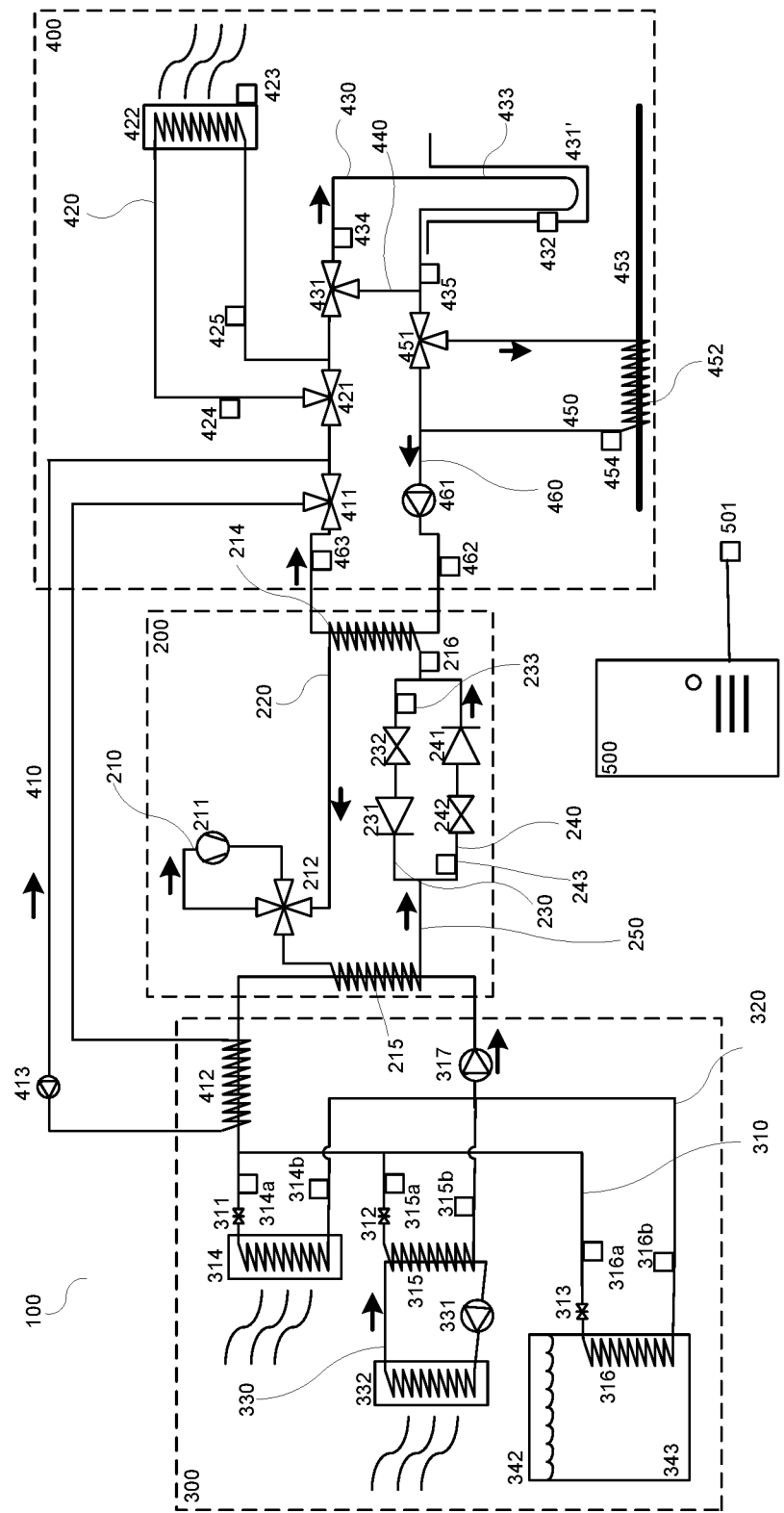
FIG. 1b is an overview diagram of a heat pump system according to the said first embodiment of the invention showing circulation in a second circulation pattern.

FIGS. 1a and 1b show a heat pump system 100 according to a preferred embodiment of the invention. The heat pump system 100 comprises a heat pump part 200, comprising an inner loop heat medium circuit 210, 220, 230, 240, 250 in which an inner heat medium is circulated. The inner loop heat medium circuit comprises at least one compressor 211 and at least one expansion valve 232, 242 (in the exemplifying embodiments illustrated FIGS., there are two expansion valves, for reasons explained below).

The heat pump system 100 is preferably arranged to heat and/or cool a construction, preferably being or comprising a building, such as an apartment building or an office or other commercial building, but preferably a small one- or two family house. Such a construction may also comprise parts to be heated and/or cooled that are peripheral to such a building, but still part of the same construction or real estate, such as an outdoor pool 342 arranged next to such a building.

Furthermore, the heat pump system 100 comprises or is associated with a primary side part 400 and a secondary side part 300. At the primary side, heat exchange is performed between a primary-side heat medium and various external sources of heat and/or cold; at the secondary side, heat exchange is performed between a secondary-side heat medium and various heat and/or cold consuming devices. Hence, thermal energy may be transported to or from the primary side 400, via the heat pump part 200, from or to the secondary side 300, depending on the requirements of heat or cold of the said consuming devices. The heat pump part 200 performs heat pumping action during the course of this transfer of thermal energy, as opposed to only performing heat exchanging. As will be exemplified below, thermal energy may also be provided directly between the primary side 400 and the secondary side 300, using heat exchange without any heat pumping action.

As illustrated in FIGS. 1a and 1b, it is preferred that the primary side 400 comprises a heat medium circuit 410, 420, 430, 440, 450, 460 which is separated from the inner loop heat medium circuit 210, 220, 230, 240, 250, wherein these two circuits communicate thermally with each other via a heat exchanger 214. Even though it is preferred that the heat exchanger 214, as well as heat exchanger 215 (see below) may be part of the inner loop 200, one or both of these may form part of part 400, 300, respectively.

However, the circuits 210, 220, 230, 240, 250 and 410, 420, 430, 440, 450, 460 may alternatively be one and the same circuit, sharing one and the same heat medium. Separating the two circuits as is illustrated in FIGS. 1a and 1b is advantageous in some embodiments, since it is then possible to select a suitable respective inner loop and primary-side heat media with greater freedom, so that one suitable heat medium can be used in the internal heat pump circuit 210, 220, 230, 240, 250, and a different suitable heat medium can be used in the primary side circuit 410, 420, 430, 440, 450, 460, the latter typically having different temperature requirements etc. than the former. On the other hand, by having only one circuit, the circulation pump 461 may for instance be omitted, leading to lower costs, and the unnecessary losses in the heat exchanger 214 may be cut. Further, the conduit in circuit 220 may have to withstand considerable pressure, which may not be the case for the circuit 460, making the system 100 less costly with the circuit 220 separated from the circuit 460.

Similarly, the secondary side 300 comprises a heat medium circuit 310, 320 which (as shown in the FIGS.) preferably is isolated but which may be shared with the inner loop heat pump circuit 210, 220, 230, 240. Through the secondary-side circuit 310, 320, a secondary-side heat medium flows, which is heat exchanged to the inner loop heat medium flowing through the internal heat pump circuit 210, 220, 230, 240, 250 using heat exchanger 215. The flow in circuits 310, 320 is driven by a circulation pump 317.

From the above, it is clear that there are three main conduit circuits the primary-side 400 circuit 410, 420, 430, 440, 450, 460; the secondary-side 300 circuit 310, 320; and the inner circuit 210, 220, 230, 240, 250. For many applications, the configuration illustrated in FIG. 1a is preferred, namely that the three main conduit circuits are separated in terms of respective heat medium flow paths. However, either the primary-side circuit and/or the secondary-side circuit may be interconnected with the inner circuit in a way so that these circuits communicate, in particular so that they actually form a connected loop circuit through which respective heat medium flows in a loop manner. Hence, the primary-side heat medium and the inner loop heat medium may be one and the same; and the secondary-side heat medium and the inner loop heat medium may be one and the same. In some cases, it is realized that all three the primary-side heat medium; the secondary-side heat medium; and the inner loop heat medium—may be one and the same heat medium, circulated in one and the same connected circuit loop 310, 320, 210, 220, 230, 240, 250, 410, 420, 430, 440, 450, 460. It is also possible that the said circuits are separated all three, possibly with three different respective heat media.

In the following, all these possibilities are considered applicable when so is possible and desired for various reasons.

According to a preferred embodiment, at least two primary heat exchanging means 422, 433, 452 are arranged to transfer thermal energy between the primary-side heat medium and at least one of two different primary heat sources or sinks selected from outdoor air, a water body, the ground or exhaust air from the construction. In this context, "the ground" can be a bore hole 431' such as the one illustrated in the FIGS., but may alternatively or additionally be, for instance, a shallowly buried collector conduit beneath a lawn or the like.

In the FIGS., the said primary heat sources or sinks are exemplified by the outdoors air near the construction to be heated and/or cooled, in that an air heat exchanger 422, such as fan convector, is arranged to transfer thermal energy to said outdoors air from the secondary-side heat medium or vice versa; the ground, in that a collector conduit 433 is arranged in a bore hole 431', and arranged to transfer thermal energy to the ground surrounding the hole 431' from the secondary-side heat medium flowing through the conduit 433 or vice versa; and exhaust air from the construction, in that a heat exchanger 452 is arranged to transfer thermal energy from the exhaust air in an exhaust air pipe 453 to the secondary-side heat medium. Said exhaust air is preferably ventilated air from a building.

Herein, the expression "primary heat exchanging means" relates to a heat exchanging means arranged to achieve thermal energy transfer between the primary-side heat medium and a primary heat source or sink arranged so that it does not substantially affect the temperature of the construction to be heated and/or cooled using a system according to the present invention. Such primary heat exchanging means may, for instance, be such means 422, 433 that are arranged outdoors or at least outside of the construction to be heated and/or cooled, or may operate on exhaust air leaving the construction, such as means 452. It is realized that there may be more than two primary heat exchanging means operating vis-à-vis one and the same heat source or sink. Apart from the three primary heat exchanging means 412, 422, 433 shown in FIG. 1a, other examples comprise arranging several parallel bore holes with respective collector conduits. Furthermore, there may also be more than two primary heat sources or sinks that are used in parallel. In the case where there are at least two primary heat sources or sinks, it is preferred that these are selected from outdoor air, a water body and the ground.

According to a preferred embodiment, there are at least one secondary heat exchanging means 314, 315, 316, arranged to transfer thermal energy between the secondary-side heat medium and at least one of two different secondary heat sources or sinks selected from indoors air, pool water, tap water and an outdoor ground or a floor in the construction. In the FIGS., these secondary heat sources or sinks are exemplified by the indoors air inside the construction, in that an indoors fan convector 314 is arranged to transfer thermal energy to said indoors air from the secondary-side heat medium or vice versa; an isolated indoors liquid heating loop, in that a heat exchanger 315 is arranged to transfer thermal energy to such an indoors water loop 330 serving indoors radiators 332 or a floor heating/cooling system, from the secondary-side heat medium, or vice versa; and the water 343 of a swimming pool 342, in that a heat exchanger 316 is arranged to transfer thermal energy to said water 343 from the secondary-side heat medium or vice versa. Not shown in the FIGS. is the option in which an outdoor ground or a floor in the construction is heated and/or cooled. In this latter case, secondary-side heat medium is directed, using a suitable secondary-side circuit, to a loop in the outdoors ground or floor for heating the topmost ground layer. For instance, the outdoors ground or floor may be a sports field requiring heating during winter in order to keep it free from snow and ice, or an ice hockey field requiring cooling for maintenance of the ice. There may also be a heat exchanger arranged between the said secondary-side circuit and the heat carrier loop arranged in the ground.

It is realized that the illustrated secondary heat exchanging means 314, 315, 316 are only examples of such secondary heat exchanging means, and further that such secondary heat exchanging means may also, for instance, be connected in series or both in series and in parallel.

The water loop 330 is served by a circulation pump 331.

The pool 342 may in certain embodiments instead be a tank for hot tap water 343, the main difference from the pool example being that the temperature requirements for the water 343 are different—for the pool a water temperature of about 20-30° C. is typically desired, whereas considerably higher temperatures, such as 50-80° C. would be desired for a hot tap water tank example.

As can be seen in the FIGS., the secondary-side heat sources or sinks are connected in a way so that heat or cold delivered from the heat pump part 200 can selectively be delivered to one or several of said secondary-side heat sources or sinks. In the FIGS., this is exemplified by the secondary-side heat sources or sinks being connected in parallel, with respective shut-off valves 311, 312, 313 being arranged to shut off either one of them in a selectable manner; and in that the inner heat medium is circulated through these parallel-connected conduits 310. This way, the control means 500 (see below) can selectively direct heat or cold from the heat pump part 200 to one or several recipients of such heat or cold at the secondary side 300.

Herein, the expression "secondary heat exchanging means" relates to a heat exchanging means arranged so that it may substantially affect the temperature of the construction to be heated and/or cooled using a system according to the present invention. Such secondary heat exchanging means may, for instance, be such means arranged to achieve thermal transfer between the secondary-side heat medium and a heat source or sink arranged indoors, or at least inside of, or within the boundaries of, a construction or real estate to be heated and/or cooled using a system according to the present invention. In a way which is analogous to the case for the primary heat exchanging means described above, there may be more than one secondary heat exchanging means operating vis-à-vis one and the same heat source or sink, such as several parallel radiator loops with their own respective heat exchanger to the secondary-side heat medium or both a direct 314 and an indirect 315, 332 heat exchange towards indoors air; and there may be more than two secondary heat sources or sinks that are used in parallel, as is shown in the FIGS.

It is realized that the term "heat source or sink" is used herein to refer to some type of entity with the capacity of absorbing and emitting thermal energy, and that may therefore be used for heating or cooling a respective heat medium via heat exchange to the heat source or sink using a heat exchange means arranged to perform such heat exchange. Whether the heat medium is actually heated or cooled depends upon the operating principle used at the particular instant, in particular upon the relative temperature difference between the heat source or sink and the heat medium. For some heat sources or sinks, such as the water of a swimming pool, only one type of thermal transfer, in that particular case heating of the pool water by cooling the corresponding heat medium, will likely or always be performed. The corresponding is true regarding source 452, which will likely or always cool the exhaust air hence warming the primary-side heat medium.

It is further realized that the term "circuit" herein is used to denote a conduit arrangement through which heat medium can flow. Such a circuit may or may not be a closed loop. A "loop circuit", however, as used herein, is a heat medium closed loop circuit.

Further according to a preferred embodiment, the system 100 comprises a respective temperature sensor 423, 432, 454, each arranged to measure the temperature of a respective one of each of said primary heat sources or sinks. Such measurement can be performed in different ways. One example is to directly measure the temperature of the heat source or sink in question, such as the sensor 423 measuring the outdoors air or the sensor 432 measuring the bore hole 431' temperature at a particular depth. However, it is also possible to measure the temperature of the heat source or sink in question indirectly, such as by measuring the temperature of the primary-side heat medium after passage through the heat exchanger 422, 433, 452 passing the heat source or sink in question, possibly taking into consideration knowledge about how a particular heat source or sink is expected to affect the temperature of a heat medium flowing past the heat source or sink in question. This is the case for temperature sensor 454, measuring the temperature of the primary-side heat medium after passage of heat exchanger 452.

In another example, a pair 424, 425 of temperature sensors, arranged to measure the temperature of the heat medium upstream and downstream of the heat exchanger 422, are used as an alternative or in addition to the sensor 423; and a pair 434, 435 of temperature sensors, arranged to measure the temperature of the heat medium upstream and downstream of the heat exchanger 433, may also be used as an alternative or in addition to the sensor 432. It is hence also possible to use a combination of these two basic measurement principles.

Further according to a preferred embodiment, the system 100 comprises a valve means arranged to selectively direct the primary-side heat medium to at least one of the said primary heat exchanging means 422, 433, 452. In the FIGS., this valve means is exemplified by a first three-way valve 421, arranged to selectively direct primary-side heat medium from circuit 460 to either circuit 420 (past outdoors air heat exchanger 422) or directly to three-way valve 431 (without passing the heat exchanger 422). Another example of said valve means is the three-way valve 431, arranged to selectively direct secondary-side heat medium from circuit 460 (arriving at three-way valve 431 from three-way valve 421 or from circuit 420) either to circuit 430 (past bore hole 431' heat exchanging collector conduit 433) or (via circuit 420) directly to circuit 440. A third example is the three-way valve 451, arranged to selectively direct secondary-side heat medium from circuit 430 or 440 either to circuit 450, via heat exchanger 452, or directly back to circuit 460.

It is preferred that the said valve means is arranged to completely or substantially completely shut off the supply of primary-side heat medium to at least two primary heat exchanging means, in a selective manner. In this sense, the valve means comprises at least two of, or even all three, three-way valves 421, 431, 451, working together as one single "valve means".

Herein, the term "selectively directing" and "selectively shutting off" means directing the heat medium to, or shutting off heat medium access to, one or more heat sources or sinks while at the same time not directing the heat medium to, or shutting off heat medium access to, other heat sources or sinks. Hence, the said valve means is arranged to control to which heat sources or sinks the heat medium is directed at each point in time.

Figure 1C:
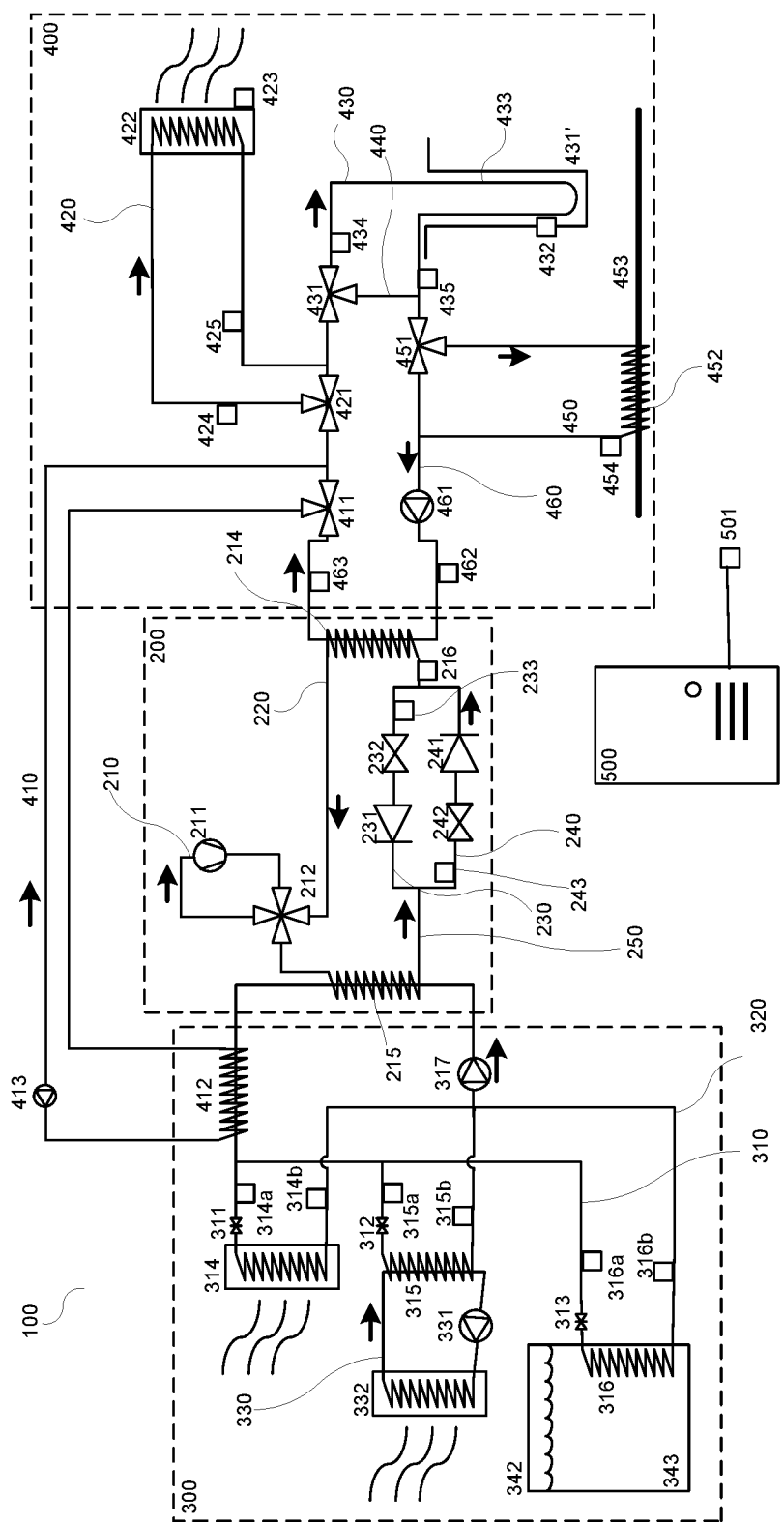
FIG. 1c is an overview diagram of a heat pump system according to the said first embodiment of the invention showing circulation in a third circulation pattern.
Figure 1D:
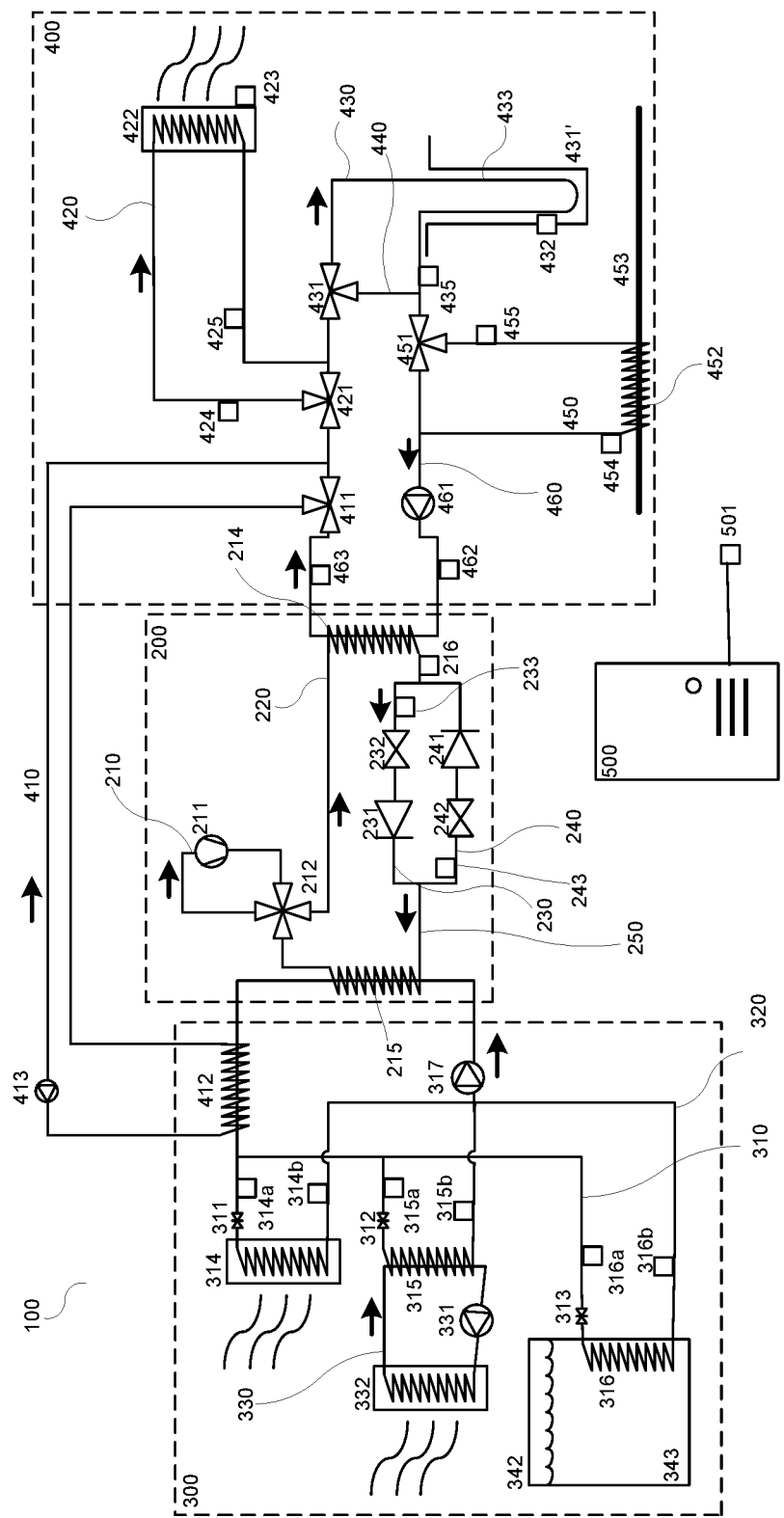
FIG. 1d is an overview diagram of a heat pump system according to the said first embodiment of the invention showing circulation in a fourth circulation pattern.

Purely for exemplifying purposes, the arrows shown in FIG. 1a illustrate the flow when the primary-side heat medium is selectively directed only to the outdoors air heat exchanger 422, while the arrows shown in FIG. 1b illustrate the flow when the primary-side heat medium is selectively directed only to the ground collector conduit 433. FIGS. 1c and 1d both illustrate a combination of these flows, hence when both heat sources or sinks are used.

Furthermore, it is preferred that a control means 500 is arranged to control said valve means 421, 431, 451, and also valve means 411 and 212 (see below). The control means 500 may, for instance, be a server arranged locally in the construction to be heated and/or cooled, or a centrally located server arranged remotely and connected to the construction via the internet. The control means 500 has a suitable wired and/or wireless digital communication interface with a number of sensors and/or actuators of the system 100, which are read and/or controlled by the control means 500. Preferably, all sensors, valves and other readable and/or controllable equipment, such as variable compressor 211 and variable expansion valves 232, 242, are connected to the control means 500 in a suitable way, for reading and/or control by the control means 500. The control means 500 preferably also has a conventional processor and a conventional database, and runs a software function for con-trot and administration of the heat pump system 100. Preferably, the control means 500 is connected to, and arranged to receive data from, external data providers such as providers of local weather forecasts, for use in the control of the system 100 operation. The control means 500 is preferably also connected to various outdoors and indoors sensors, such as temperature, air pressure, humidity, sunlight incidence, etc. sensors, which may be conventional as such and are jointly illustrated in the FIGS. by 501. Using such external data and sensors, the control means 500 is arranged to control the system 100 with the aim of maintaining, over time, a predetermined indoors temperature interval; a respective minimum hot tap water and pool water temperature, and so forth, depending on settings made by a user of the system 100, such as remotely using a web server user interface means provided by the control device 500. This control function of the control device 500 will be exemplified in the following.

The system 100 can be run in several different modes. As used herein, in a "secondary-side heating operating mode", thermal energy is transferred from at least one primary-side 400 heat source and is transferred, via heat pump action in the part 200 and heat exchange as described above, to at least one heat consuming secondary-side 300 heat sink. Correspondingly, in a "secondary-side cooling operating mode", thermal energy is transferred from at least one secondary-side 300 heat source and is transferred, via heat pump action in the part 200 and heat exchange, to at least one primary-side 400 heat sink. In the secondary-side cooling operating mode, thermal energy can also be transferred from the secondary side 300 to the primary side 400 without heat pumping, as exemplified by circuit 410 (see below).

As mentioned above, the heat pump part 200 comprises a compressor 211, which preferably also acts as a pump. The compressor 211 is connected to a four-way valve 212, arranged to control the function of the heat pump part 200 to be either a cooling or a heating heat pump with respect to the secondary side 300. In heating operation, the internal heat medium flow of which is illustrated using arrows in FIGS. 1a-1c, the four-way valve 212 directs the heat medium to circuit 250, for delivering heat via heat exchanger 215 to the secondary side 300. Returning there-from, the heat medium passes circuit 240, comprising expansion valve 242 and non-return valve 241, after which the heat medium passes the heat exchanger 214 and returns, via circuit 220 and the four-way valve 212, back to the compressor 211.

On the other hand, in a cooling operation of the heat pump part 200, the flow of which is illustrated using arrows in FIG. 1d, the four-way valve 212 is set so that the internal heat medium flowing out from the compressor 211 is directed to circuit 220 and then heat exchanger 214, for delivering heat to the primary side 400. Thereafter, the heat medium passes circuit 230, comprising expansion valve 232 and non-return valve 231, after which it passes to circuit 250 and heat exchanger 215 for absorbing heat from the secondary side 300. Thereafter, the heat medium passes again, via the four-way valve 212, back to the compressor 211.

The non-return valves 231, 241 make sure that either expansion valve 232 or expansion valve 242 is passed, depending on the flow direction of the internal heat medium. This construction is a simple yet robust one for achieving reversibility of the heat pump part 200.

Namely, it is preferred that the heat pump part 200 is reversible, in other words it can be set in a heating mode, delivering thermal energy from the primary side 400 to the secondary side 300, and in a cooling mode, delivering thermal energy from the secondary side 300 to the primary side 400. The reversibility may be provided using other valve arrangements than the one illustrated, for exemplifying reasons, in the FIGS. The control means 500 is arranged to control the heat pump part 200 to, for each particular point in time, be either in a heating or cooling mode.

According to a preferred embodiment, the control means 500 is arranged to, in at least one such secondary-side heating operating mode, measure the temperature of the said primary heat sources or sinks, and to control the said valve means 421, 431, 451 to selectively direct the primary-side heat medium to only the primary heat exchanging means that is available for providing heat to the heat pump circuit and associated with the primary heat source or sink with the highest temperature, or to several of said primary heat exchanging means that are available for providing heat to the heat pump circuit and associated with the primary heat source or sink with the highest temperatures, such as the two heat sources that are warmest for the time being.

Herein, the expression "available for providing heat to the heat pump circuit" means that the primary heat source or sink in question is sufficiently warm so as to be able to heat, via heat exchange, at least one heat medium in the heat pump circuit 210, 220, 230, 240, 250, 310, 320, 410, 420, 430, 440, 450, 460 with the purpose of providing heat to at least one of the secondary heat sources or sinks as described above. This may mean that the primary heat source or sink in question is warmer than a primary-side heat medium flowing, in a primary-side heat pump circuit 410, 420, 430, 440, 450, 460, past a heat exchanger 214 of an inner-loop heat pump circuit 210, 220, 230, 240, 250, as is illustrated in FIGS. 1a-1c. For instance, such primary-side heat medium temperature may be measured immediately downstream of such a heat exchanger 214 using an optional temperature sensor 463 and compared to the measured temperature of the primary-side heat source or sink. This may, alternatively, in the case in which the inner-loop circuit and the primary-side circuit share one and the same heat medium, mean that the primary heat source or sink in question is warm enough to be determined by the control means 500, based upon some predetermined condition, to be able to provide efficient heating given the current operating state of the heat pump circuit. Such condition is preferably determined based upon temperature measurements of the heat medium flowing in the heat pump circuit.

It is noted that the temperature of the primary heat sources or sinks can be measured directly or indirectly, as described above.

Using such a heat pump system 100, with a valve system for selectively directing a primary-side heat medium to several different primary-side heat sources or sinks, and actively selecting the warmest one or ones for transferring thermal energy to the heat pumping function of the heat pump system, the system can be allowed to always operate at a high efficiency. In particular, it is possible to achieve such high efficiency across a broader power interval, and preferably without having to use a top-up heat source (such as electric heating) to handle power requirements peaks.

According to a preferred embodiment, the control means 500 is arranged to, in at least one mode of operation, not direct the primary-side heat medium to all primary heat exchanging means 422, 433, 452 that are available for providing heat to the heat pump circuit, but only to a subset of available such primary heat exchanging means. To take a simple example, in case a system has access to both an outdoors air heat source and a ground heat source, both of which are available since they are warm enough, the control means may direct the heat medium only to the corresponding heat exchanger 422 of the outdoors air heat source, since this heat source is warmer than the ground heat source. Since there may be many different heat sources or sinks available to the system, the selection may be more complex than this simple example.

In a first preferred alternative, the control means 500 is arranged to first evaluate, by temperature measurement as described above, which primary heat exchanging means 422, 433, 452 are available for providing heat to the heat pump circuit, and then to select to which of such available primary heat exchanging means to direct the primary-side heat medium. Hence, in this case only available heat sources or sinks are considered for selection, and the selection is performed from available such heat sources or sinks as a subset of one or several such available heat sources or sinks.

In a second preferred alternative, the control means 500 is arranged to first select to which primary heat exchanging means 422, 433, 452 to direct the primary-side heat medium, namely to the heat exchanging means of one or several warmest heat sources or sinks, as described above. Thereafter, the control means 500 is arranged to adjust a temperature of the heat pump circuit 210, 220, 230, 240, 250, 310, 320, 410, 420, 430, 440, 450, 460 so as to be able to accept heat from the selected one or several primary heat exchanging means. This is hence the other way around as compared to the first preferred alternative—instead of selecting among available heat sources or sinks, the selection is performed first, and then the selected heat sources or sinks are made available by means of a suitable temperature adjustment in the heat pump circuit. This is particularly advantageous when high heating power is required, for instance in a secondary-side heating operation mode in which tap water is to be heated as quickly as possible. Then, more primary heat sources or sinks can be recruited for maximum power, while adjusting down the said heat pump circuit temperature so as to be able to harvest the heat provided by the selected heat source or sources even in case at least one of the selected heat sources provides a lower temperature than what is exploitable without such a temperature adjustment. In particular, it is preferred to, in reaction to a temporary increase in heating power requirements, recruit at least one addition heat source or sink the temperature of which is lower than currently exploited heat sources or sinks.

To be more specific, we take the particular case, described above, in which the heat pump circuit 210, 220, 230, 240, 250, 310, 320, 410, 420, 430, 440, 450, 460 comprises an inner loop heat medium circuit 210, 220, 230, 240, 250, in turn comprising the compressor 211, the expansion valve 232, 242 and the inner loop heat exchanger 214, which heat exchanger 214 is arranged to thermally communicate with a separate primary-side heat medium circuit 410, 420, 430, 440, 450, 460, in turn comprising the primary exchanging means 422, 433, 452. In this case, the control means 500 is preferably arranged to perform the said adjustment of a temperature of the heat pump circuit by adjusting a temperature of the heat medium flowing through the said inner loop heat exchanger 214. Such temperature adjustment may be based upon a temperature measurement from optional temperature sensor 216 arranged immediately upstream, and/or possibly immediately downstream, of the heat exchanger 214 in question. Hence, the temperature of the inner-loop heat medium is adjusted to a temperature which is lower than the one delivered from the primary-side heat pump circuit to the heat exchanger 214, making it possible for the primary-side heat medium to heat the inner-loop heat medium. It is understood that, in particular in case there are several selected primary heat sources or sinks, the primary-side heat medium delivered to the heat exchanger 214 may have a temperature which is different from the temperature of each individual heat source or sink. Therefore, the temperature measured by sensor 216 may be compared to a temperature measured by sensor 462 or 463. In general, the temperature of the inner-loop heat medium which is heat exchanged to the primary-side heat medium is adjusted to a temperature which is lower than the selected heat source or sink with the lowest temperature.

In particular, it is preferred that the control means 500 is arranged to adjust said temperature of the inner-loop heat medium flowing through the said inner loop heat exchanger 214 by adjusting the power of the compressor 211 and/or the power of a separate pump (in case the compressor 211 is supplemented by such an additional pump). This adjustment may be performed as a regulation loop, using temperature readings from sensor 216 in a feedback loop. In addition to controlling the compressor 211 and/or such a pump, or instead of such control, an opening of the expansion valve 242 can be controlled so as to achieve such an inner-loop heat medium temperature. The regulation of the expansion valve 242 may be performed in a similar feedback loop, or such a feedback loop may be implemented using control of both the compressor 211 and/or said pump, as well as the expansion valve 242.

During such a regulation, it is preferred that the control of the compressor 211 is performed so as to achieve a desired system 100 power, while the expansion valve 242 is controlled so as to achieve a desired heat medium temperature, as described in further detail below.

A similar regulation can be performed of the shared heat medium in the case in which the inner-loop and primary-side circuit share one and the same heat carrier. Then, the temperature of the heat medium may be measured using temperature sensor 216 and the compressor 211 and/or a pump and/or the expansion valve 242 may be controlled so as to achieve a heat medium temperature making it possible for the heat medium to be heated when passing the corresponding heat exchanging means of the selected primary heat sources or sinks.

In particular, in the preferred case that the primary heat sources or sinks to which the said valve means is arranged to selectively direct the primary-side heat medium comprise at least one heat source or sink which is outdoors air and at least one heat source or sink which is the ground (as illustrated in the FIGS.), it is preferred to only cool the ground, in particular a bore hole 431', when the ground temperature, as measured by sensor 432, is higher than the outdoors air, as measured by sensor 412. This also results in a simple and efficient way of not cooling the ground unnecessarily, which provides for a more efficient use of available thermal energy in the ground.

In case exhaust air is available via conduit 453, and in case that exhaust air is warmer than the outdoors air, it is preferred to use heat source 452 instead of, or, preferably, in addition to, heat source 422, at least as long as the heat source 433 is cooler than heat source 452.

Correspondingly, according to a preferred embodiment, the control means 500 is further arranged to, in a secondary-side cooling operating mode, control the valve means 421, 431, 451 to selectively direct the primary-side heat medium to only the primary heat exchanging means with the lowest temperature, as measured by the temperature sensors 423, 424, 425, 432, 434, 435 and/or 454. This will provide high operating efficiency.

In the preferred embodiment in which several primary-side heat sources or sinks are used during said secondary-side heating operation mode, it is further preferred that the control means 500 is arranged to selectively direct primary-side heat medium to at least two of the primary heat exchanging means with higher temperatures than a predetermined minimum temperature. In particular, it is preferred that all, or at least two, of the primary heat sources that are warmer, for the time being, than the said predetermined minimum temperature are used. Preferably, the said predetermined minimum temperature is between 0 and 10° C., more preferably between 2 and 5° C. In particular, it is preferred that outdoors air (source 422) is not used as a heat source in case the temperature of the outdoors air is less than about 2° C. above the average current temperature of the ground when a ground heat source 433 is available. The average current temperature can be measured in a way which is conventional as such.

In a similar preferred embodiment for use during the mentioned secondary-side cooling operation mode, in which several primary-side heat sources or sinks are used during said secondary-side cooling operation mode, it is further preferred that the control means 500 is arranged to selectively direct primary-side heat medium to at least two of the primary heat exchanging means with lower temperatures than a predetermined maximum temperature. In particular, it is preferred that all, or at least two, of the primary heat sources that are cooler, for the time being, than the said predetermined maximum temperature are used. Preferably, the said predetermined maximum temperature is between 5 and 15° C., more preferably between 7 and 10° C. In particular, it is preferred that outdoors air (source 422) is not used as a cool source in case the temperature of the outdoors air is more than about 2° C. below the average temperature of the ground when a ground cool source 433 is available.

In particular, the following different secondary-side heating operating modes are envisaged:
1. During a cold season, such as winter in tempered climates, when there is a need for heating indoors air and tap water, and when the outdoors air is cooler than the ground surrounding the bore hole 431', thermal energy is only drawn from the ground. In other words, the three-way valve 421 is set as shown by the flow arrows in FIG. 1*b*, with left and right outlets open and the top outlet (as seen in the orientation of the FIGS.) closed. At the same time, the three-way valve 431 is set with its left and right outlets open, but the bottom one closed. Then, the primary-side heat medium flows as is illustrated in FIG. 1*b*. This way, the more efficient heat from the ground (as compared to from the outdoors air) can be used for heating of the construction. It is noted that, in this mode, the exhaust air may be heated also, if available. This is then performed by the three-way valve 451 having its right and bottom outlets open and its left outlet closed, which is also illustrated in FIG. 1*b*.

2. During a warm season, such as summer in tempered climates, when the outdoors air is warmer than the ground surrounding the bore hole 431', thermal energy is only drawn from the outdoors air. Hence, the three-way valve 421 is set with its left and top outlets open, and its right outlet closed, while three-way valve 431 is set with its left and bottom outlets open, and its right outlet closed. Then, flow of primary-side heat medium will be as in FIG. 1*a*. In this case, as well as in operating mode 1, the exhaust air may also be used, such as illustrated in FIGS. 1*a* and 1*b*.

3. In case the temperature difference between two heat sources, such as the outdoors air and the ground, is less than a predetermined value, such as 5° C., it is preferred that only heat sources that do not require an operating fan, such as the ground heat exchanger 433 and the exhaust air heat exchanger 452 in the particular case illustrated in the FIGS., are used.

4. During unusually large requirements for heating at the secondary side 300, the three-way valve 421 has its left and top outlet open, while its right outlet is closed, and the three-way valve 431 has its left and right outlet open, while its bottom outlet is closed. Then, the flow will be as illustrated in FIGS. 1*c* and 1*d*, and both primary-side heat sources will be used for heating at a heating power which is higher than a normal heating power provided only using one of the heat sources. This operation mode is also useful when there is a need for secondary-side 300 heating and the outdoors air is warmer than the ground (in this case, a large temperature difference is allowed between outdoors air and the ground). Then, the outdoors air heat exchanger 422 will be passed first by the primary-side heat medium, such that it is preheated by the outside air, after which the hence preheated heat medium passes the bore hole 431' in the ground. This way, a heated primary-side heat medium will result for heat exchange in heat exchanger 214 with the inner circuit 210, 220, 230, 240, 250, while at the same time the ground surrounding the bore hole 431' will be recharged with heat.

5. During times when the ground surrounding the bore hole 431' is cooler than the outdoors air, and when there is no need for heating or cooling at the secondary side 300 for the time being, it is preferred that the three-way valve 421 is set with its left and top outlets open, while its right outlet is closed, and that the three-way valve 431 is set with its left and right outlets open, while its bottom outlet is closed, why the primary-side heat medium flow is as illustrated in FIGS. 1*c* and 1*d*. At the same time, the inner circuit 210, 220, 230, 240, 250 flow is inactivated, by the compressor 211 being switched off, resulting in no heat exchange at heat exchanger 214. The result is that thermal energy is moved from the outdoors air to the bore hole 431', effectively recharging the ground surrounding the bore hole 431' with heat, which may be used during the cold season for heating of the construction. Hence, this is a bore hole 431' recharging operation mode. It is noted that the three-way valve 411 (see below) in this case has its left and right outlets open and its top outlet closed, so that no thermal transfer is performed between the primary 400 and secondary 300 sides.

The bore hole 431' recharging mode is particularly preferred for already existing bore holes 431' that are under-dimensioned, such as in terms of bore hole 431' depth, for the heating requirements of the said construction. In this case, it is a method according to a preferred embodiment of the present invention comprises an initial step in which the system 100 components are installed using said already-existing bore hole 431', and in that the method further comprises a step in which the bore hole 431' is recharged as described above under operating mode 5. Preferably, the temperature of the heat medium leaving the bore hole 431 is measured, and a trend is monitored. Recharging mode is then initiated as needed based upon the said trend, so that the bore hole 431' is recharged when the ground surrounding the bore hole 431' becomes too cool.

In addition to the modes 1-5 described above, the exhaust air heat exchanger 452 can be used as a heat source whenever so is desirable, to increase the efficiency of the system 100.

As mentioned above, the present invention further encompasses a method for controlling the heat pump device 100. Such a method comprises a step in which the control means 500 measures the temperature of said secondary heat sources or sinks, as well as a further step, in the above described secondary-side heating operating mode, in which the control means 500 controls the valve means 421, 431 to selectively direct the primary-side heat medium to only the primary heat exchanging means with the highest temperature, or to several of said primary heat exchanging means having the highest temperatures.

According to a preferred embodiment, the speed of the compressor 211 can furthermore be dynamically controlled, by the control means 500. Furthermore according to this embodiment, a respective opening size of at least one, preferably each, of the expansion valves 232, 242 is adjustable, also by the control means 500. Then, the control means 500 is arranged to control the instantaneous power of the heat pump system 100 by controlling the instantaneous speed of the compressor 211, and the control means 500 further being arranged to, at the same time, control an output temperature of the heat medium (in the exemplifying embodiment illustrated in the FIGS. by the internal heat medium) flowing out from the respective expansion valve 232,242 by controlling the opening of the expansion valve 232, 242 in question given the controlled speed of the compressor 211.

A compressor 211 speed increase will result in an increased pressure difference across the compressor 211, together with an increased temperature of the inner heat medium flowing out from the compressor 211. A more open expansion valve 232, 242 will result in a greater flow of heat medium out from the expansion valve 232, 242 in question but at the same time lower temperature of such heat medium. Hence, by setting the speed of the compressor 211 to correspond to a desired heat pumping power and then adjusting the expansion valve 232, 242 to a desired output temperature of the inner heat medium, a heat medium of a particular temperature (for heat exchanging with secondary-side heat consumers) is produced at a desired heating power.

This results in a flexible heating power. During "normal" operation, the compressor 211 may be set to a non-maximum speed, meeting the heating power needs of a "normal" state of the construction. However, during heavier heating power requirements, the compressor 211 speed can be increased to meet the higher requirements while still producing heat medium of a desired temperature using a controlled smaller expansion valve 232, 242 opening. As a consequence, the heat pumping system 100 can be designed without the need for an additional top-up heating source, such as an electrical direct heating source, for handling peak heating operation situations, and still providing for efficient operation during most operation situations. This provides for better economy and environmental concern. Furthermore, during times when the construction cannot accept heating at a normal rate without being overheated, the compressor speed can be controlled down to meet such decreased heating requirements rather than being completely switched off.

Further advantages will be explained in connection to the following preferred embodiments.

It is noted that a method according to the present invention preferably comprises a corresponding method step, in which the speed of the compressor 211 is controlled by the control means 500, so as to achieve a certain heat pumping power of the heat pump system 100. Furthermore, the method comprises a step in which an opening of the expansion valve 232, 242 is adjusted by the control means 500 so as to achieve a certain output temperature of inner heat medium flowing out from the expansion valve 232, 242 in question, given the controlled speed of the compressor 211.

That the expansion valve 232, 242 is controlled "given the controlled speed of the compressor 211" means that the compressor 211 is controlled to a particular speed, and that the expansion valve 232, 242 is controlled to achieve the said output temperature with the compressor 211 speed as a given variable.

According to one preferred embodiment, illustrated in the FIGS., the heat pump system 100 comprises at least two secondary heat exchanging means 314, 315, 316 as explained above, and the heat pump system 100 further comprises a valve means 311, 312, 313 as described above, arranged to, under control from the control means 500, selectively direct the secondary-side heat medium to one or several of said secondary heat exchanging means 314, 315, 316, preferably for heating one or several corresponding secondary-side heat consumers. Furthermore, the control means 500 is arranged to control the said output temperature of the heat medium flowing out from the expansion valve 242 based upon what secondary heat exchanging means 314, 315, 316 is or are used for this heat exchange for the time being.

Hence, if a low-temperature floor heating system circuit 330 is active as the only used secondary-side heat consumer, the output temperature is controlled to a relatively low value, such as between 20-50° C., with a corresponding large flow velocity of the heat medium flowing out from the expansion valve 242. On the other hand, if tap water 343 is to be heated, the output temperature is controlled to a relatively high value, such as between 50-70° C., with a corresponding small flow velocity of the heat medium flowing out from the expansion valve 242. Hence, depending on what secondary-side heat consumer(s) is or are to be used, the temperature of the heat medium can be altered without modifying the overall operating power of heat pumping function of the system 100. When there are several secondary-side heat consumers, it is preferred that a desired heat exchanging temperature for the highest temperature-desiring secondary-side heat consumer is selected as the desired output temperature from the expansion valve 242. In the latter case, a feedback or shunt valve arrangement (not shown in the FIGS.) can be used to lower the temperature of the secondary-side heat medium flowing through lower temperature-requiring secondary-side heat consumer heat exchangers.

In particular, it is preferred that the heat medium circuit 210, 220, 230, 240, 250, 310, 320, 410, 420, 430, 440, 450, 460 comprises at least two secondary heat exchanging means 314, 315, 316. Then, the system 100 can be operated in a first secondary-side heating operating mode, in which a secondary heat exchanging means 314 (or 315 in combination with 331 and 332) is used to transfer thermal energy to indoors air. Further, the system 100 can be operated in a second secondary-side heating operating mode, in which a secondary heat exchanging means 316 is used to transfer thermal energy to hot tap water 343. Under these prerequisites, the opening of the expansion valve 242 is adjusted so that the output temperature of heat medium flowing out from the expansion valve 242 is higher in the second secondary-side heating operating mode than in the first secondary-side heating operating mode. Such different secondary-side heating operating modes can then be used alternatingly, such as using an alternation time interval of between 5 and 30 minutes, to over time provide heat to both indoors air and hot tap water.

According to a particularly preferred embodiment of the present invention, the said control of the expansion valve 232, 242 opening is a feedback control which is based upon a measurement value from a respective temperature sensor 233, 243, comprised in the heat pump 100 system and arranged downstream of the respective expansion valve 232, 242 opening. The measurement value is provided to the control device 500, which then dynamically con-troll the expansion valve 232, 242 in question in a feedback manner, so as to keep the desired output temperature of the expansion valve 232, 242 depending on the current operation mode of the heat pump system 100.

According to one preferred embodiment, the control of the compressor 211 speed is controlled to meet a desired total heat pumping power of the system 100, and based upon a given current temperature of one or several primary-side heat sources or sinks. More particularly, in this embodiment the heat pump system 100 comprises at least one temperature sensor 423, 424, 425, 432, 434, 435, 454, arranged to measure the temperature in a respective one of said primary heat exchanging means or of the corresponding primary-side heat medium after heat exchange in the primary heat exchanging means in question. The system 100 can then be operated in a first primary-side heating operating mode, in which at least one of said primary heat exchanging means 433 is used to transfer thermal energy from the ground or a water body, such as a lake, as well as in a second primary-side heating operating mode, in which at least one of said primary heat exchanging means 422 is used to transfer thermal energy from the outdoors air. According this embodiment, the control device 500 is arranged to then control the speed of the compressor 211 so that the total instantaneous heating power requirement for the heat pump system 100 is met given the current measured temperature in the said primary heat exchanging means of the primary-side heat medium after the heat exchange performed in the currently used primary-side heating operating mode. It is noted that the compressor 211 speed required to meet a particular total power requirement is different for these two primary-side heating operation modes, using different temperatures of the primary-side heat medium flowing through the heat exchanger 214. Alternatively, the temperature of the primary-side heat medium can also be measured at the heat exchanger 214, using an optional temperature sensor 462.

A normal building, in particular a small one- or two family house, typically has a thermal energy requirement that varies heavily over time. Sometimes, the energy requirement will be zero, while peak energy requirements may be high, with the upper limits being determined by, for instance, the size of the house, the temperature difference between outdoors air and indoors air, as well as hot tap water usage. For a normal one- or two family house located in tempered climates such as in the Nordic countries, a typical thermal energy requirement is between about 0-12 kW at any given point in time over the year.

Conventionally, to handle peak requirements, a geothermal heat pump is combined with a direct electrical heating which is only used during peak production. When using the heat pump system 100 of the present invention, it is preferred not to use any such additional heating system for use only during peak production, and in particular not such a direct electrical heating system, arranged to electrically heat indoors air directly or via a liquid radiator circuit, or hot tap water, at all. Instead, it is preferred to use control of the compressor 211 speed as described above to adjust the power of the system 100 to handle shifting heating (or cooling) needs.

Another conventional alternative is to use an accumulation tank, such as an additional water tank, to store thermal energy for use during peak requirements. According to the present invention, it is preferred not to have such an accumulation tank, apart from a possible hot tap water tank 342. According to one embodiment, there may however exist an accumulation tank (not shown in the FIGS.) along circuit 310, from which all or some of the secondary-side heat exchangers 314, 315, 316 draw their heat and/or cold.

In the following, particular examples are described of operation of the heat pump system 100 in accordance with the present invention, especially with respect to the variability of the compressor 211 and the expansion valve(s) 232, 242.

In a first example, the outdoors temperature is a bit cooler than what is normal for the location at which the construction is situated, say that the outdoors temperature is 0° C. The current heating requirements of the building in question are high, since a user of the building has recently taken a bath, why there is a need to reheat relatively large amounts of hot tap water. Also, the weather forecast delivered to the control means 500 indicates that the outdoors temperature is about to fall to even lower temperatures during the coming hours.

Hence, as a result the control means 500 initiates an operating mode in which maximum heat is to be delivered to both the heat exchangers 314 and 315, and also to the heat exchanger 316 for heating hot tap water. At the moment, measured temperatures indicate to the control means 500 that energy can be efficiently drawn from both the outdoors air and the bore hole 431'. Therefore, the primary-side heat medium is circulated passed both heat exchangers 422, 433, to deliver thermal energy to the inner circuit 210, 220, 230, 240, 250 via the heat exchanger 214. The compressor 211 is set to maximum speed, providing maximum heat pumping power, and the expansion valve 242 is set, during each point in time during operation, so that the temperature is suitable for heating either indoors air or hot tap water, in case these two secondary-side heating actions are performed one at a time (preferably in an alternating manner, in which the valves 311, 312, 313 are activated so that the secondary-side heat medium is delivered to the heat exchangers 314/315 or 316 alternatingly, every other predetermined time period). For heating indoors air, the expansion valve 242 will be set to a more open position than is the case for when heating tap water, as explained above. In case both heat exchangers 314/315 and 316 are operated simultaneously, the expansion valve 242 may be set so that the secondary-side heat medium assumes a temperature which is suitable for heat exchanging with the indoors air heat exchangers 314 or 315.

In a second example, the expansion valve 232, 242 is operated across differently open states to achieve different aims. For instance, if a non-zero heat pumping action is instead desired, the expansion valve 232, 242 must provide a pressure difference between heat medium upstream and downstream of the expansion valve 232, 242. In this latter case, the expansion valve 232, 242 may be set by the control means 500 to any setting between 0-50% open.

In case the compressor 211 operates at full speed, a 40% open expansion valve 232, 242 may, in an exemplifying case, result in 80° C. inner heat medium. In case the compressor 211 operates at 50% of full speed, the expansion valve 232, 242 may be set to 20% open, and as a result provide 85° C. inner heat medium with a total instantaneous power of about half of the full speed example. Hence, the same or nearly the same heat medium temperature can be achieved using various heat pumping powers.

In a third example, it is summer in a Nordic country. The outdoors temperature is 25° C., and there is no need for indoors heating. However, the need for hot tap water is higher than normal. Also, there is a need for heating of a pool 342. Thermal energy is then drawn from the outdoors air only (providing higher efficiency and avoiding cooling of the ground), via heat exchanger 422, and is delivered at medium power and high temperature, by control of the compressor 211 and the expansion valve 242, to respective secondary-side tap water and pool heat exchangers. In case cooling of indoors air is required, intermittent/interchanging operation may be performed by the control means, in which indoors air is cooled via corresponding secondary-side heat exchangers and pushing thermal energy into only the bore hole 431' (recharging the bore hole 431') by setting valves 421, 431 at illustrated in FIG. 1b while running the heat pump part 200 as illustrated in FIG. 1d, during every other predetermined time period, and in which tap water and pool water is heated during every other predetermined time period, drawing thermal energy only from outdoors air by setting valves 421, 431 as illustrated in FIG. 1a. The power and heat medium temperature is adjusted so as to suit the particular requirements during every such predetermined time period.

In particular, the power of the compressor 211 is controlled down in the heating sequence of this operating mode in case there is a risk of overheating the tap water or the pool water. This will avoid the heat pump system 100 to have to be shut down for security reasons, which is otherwise a risk with a conventional system.

In general, it is preferred that a variable compressor 211 according to the present invention is dimensioned so that it runs at peak compressor efficiency at or near a "normal" heat pump requirement of the construction, and so that it also has capacity of delivering a maximum heat pump power which covers most operating prerequisites. For instance, if a "normal" power requirement is about 5 kW, the compressor 211 should run at or near its peak efficiency at a speed corresponding to 5 kW when using a 5° C. primary-side heat medium (which would be a normal temperature in the present example, using the bore hole 431' located in the Stockholm area). The electrical power required to run the heat pump system 100 at this power and under those prerequisites would be about 1 kW or thereabouts.

The heat pump system 100 also allows a direct cooling operation without heat pumping action ("free cooling"), according to the following. In this embodiment, the heat pump system 100 comprises a respective temperature sensor 423, 424, 425, 432, 434, 435, measuring the temperature in the said primary heat exchange means 422, 433 or of the primary-side heat medium after heat exchange in the primary heat exchange means 422, 433. Then, the heat pump system 100 can be operated in a first secondary-side cooling operating mode, in which the heat medium cools indoors air. In this operating mode, the control device 500 is arranged to control a valve means 411 comprised in the primary side 400 of the heat pump system 100 so that the heat pump part 200 is bypassed in the said first secondary-side cooling operation and when the measured temperature in the used primary heat sink is lower than a predetermined temperature value. A circulation pump 413 in the circuit 410 is used to provide the primary-side heat medium to heat exchanger 412, which in turn is arranged to transfer thermal energy from the secondary-side heat medium in circuit 310 to primary-side heat medium in circuit 410. This way, the cooled primary-side heat medium will, via heat exchanger 412, achieve cooled primary-side heat medium, which is then used to cool the indoors air, for instance via heat exchangers 314 and/or 315. In this case, which is illustrated in FIG. 1d, the said predetermined temperature value may be as high as about 4-5° C. lower than the desired indoors air. Since no heat pumping is required in this operating mode, less energy will be spent while still achieving a comfortable indoors climate, using the same heat pump system 100 as is capable of providing flexible and efficient thermal energy management as described in the numerous embodiments explained above.

According to one preferred embodiment of the present invention, the heat pump system 100 can be used in a method for monitoring valve leaks in the heat pump system 100. In this aspect, there are at least three heat exchanging means 314, 315, 316, 422, 433, 452, as described above, arranged to transfer thermal energy between the secondary, inner and/or primary heat medium and a respective heat source or sink selected from outdoor air, a water body, the ground, indoor air, pool water or tap water. There are also valve means 311, 312, 313, 421, 431, 451, arranged to selectively direct the heat medium to at least two of said heat exchanging means. This has been described in detail above.

In this embodiment, the heat pump system 100 comprises respective pairs of temperature sensors 314a, 314b; 315a, 315b; 316a, 316b; 424, 425; 434, 435; and 455; 454, arranged both upstream and downstream of at least one, preferably each, of said heat exchanging means 314, 315, 316, 422, 433, 452. Then, the determination by the control means 500 of which primary and/or secondary heat exchanging means 314, 315, 316, 422, 433, 452 to direct the corresponding heat medium to, as described above for different operating modes, is performed based upon temperature measurement values comprising at least one value read from said sensors of said temperature sensor pairs. Further, when respective heat medium is not directed to a certain one of said heat exchanging means, the control means 500 is arranged to read a measured temperature value upstream and measured temperature value downstream of the certain heat exchanging means in question, to compare these values to each other and to set off an alert in case the values differ by more than a predetermined value.

Namely, such a read temperature difference indicates that there is a leakage in a valve arranged to direct heat medium to the heat exchanger in question, and such an alert is preferably arranged to warn a maintenance responsible person that the valve in question may need service or replacement. The valve may be any type of valve, such as a shut-off valve or a three-way valve.

For example, in case no heat medium is to be delivered to heat exchanger 314, the shut-off valve 311 is activated, with the purpose of stopping secondary-side heat medium to flow past the heat exchanger 314. Then, temperature sensors 314a, 314b are read, and if there is a detected temperature difference between the values read from these sensors, which difference is larger than a predetermined value, it is likely that the shut-off valve does not function properly, and the alert is set off.

Another example is that the temperature sensors 424, 425 are used, as described above, to determine that the heat exchanger 422 is not be used in the current operating mode. Therefore, the three-way valve 421 is set into the position in which its left and right outlets are open and its top outlet is closed, resulting in that no primary-side heat medium flows through circuit 420 past heat exchanger 422. In case the control means 500 thereafter reads a temperature difference between sensors 424 and 425, this would indicate that the three-way valve is not working properly, and an alarm is set off with respect to the three-way valve.

Since the said temperature difference measuring sensors are a part of the heat pump system 100 anyway, using them to detect a malfunctioning valve adds only very little additional complexity to the system 100.

According to one preferred embodiment, the said temperature difference is measured and considered by the control means 500 only a certain time period, such as at least 5 minutes, after the respective heat exchanger has been inactivated, in other words that control means 500 has determined that no heat medium is to be directed to the respective heat exchanger. This will use the computing power of the control means to avoid false alarms being set off in connection to the disconnection of particular heat exchangers.

According to another preferred embodiment, the control means 500 measures the said temperature difference repeatedly over time when the corresponding heat exchanger is disconnected, in other words when it does not receive any heat medium, and sets off said alert in case the read absolute temperature difference increases with more than a predetermined value, preferably at least 2° C., between a reference reading, measured previously but after the disconnection of the heat exchanger in question, that is when the heat medium was disconnected to the heat exchanger in question, and a later reading, measured after the reference reading while the heat exchanger is still disconnected.

According to one preferred embodiment, the temperature value under the currently used operating mode is measured over an extended time period, so as to provide the control means 500 with statistical data over how the measured temperature difference varies. Then, the alarm is set off in case the measured temperature difference deviates more than a predetermined number of standard deviations from zero.

The alarm can, for instance, be in the form of a digital message automatically sent to a predetermined SMS, e-mail or other type of preregistered recipient.

Hence, a method according to the present invention will, in this case, comprise a step in which the control means 500 reads temperature measurement values comprising at least one value read from said temperature sensor pairs and, based upon these values, determines to what heat exchanging means the heat medium is to be directed. Then, such a method further comprises a step in which, when heat medium is not directed to a certain heat exchanging means the control means reads a measured temperature value upstream and downstream of the certain heat exchanging means, compares these values to each other and sets off the said alert in case the values differ by more than said predetermined value.

In the alternative system described above, in which the heat pump part 200 and the primary-side part 400 share one and the same heat medium, the heat exchanger 214 is hence not used. Furthermore, in such an alternative system, the heat pump part 200 is preferably not reversible, but only arranged for heating. The free cooling circuit 410 is also not used.

A system and a method according to the above solve the initially mentioned problems.

Above, preferred embodiments have been described. However, it is apparent to the skilled person that many modifications can be made to the disclosed embodiments without de-parting from the basic idea of the invention.

For instance, it is realized that the details of the heat pump system 100 as illustrated in the FIGS., such as position of temperature sensors, combination of primary/secondary heat sources or sinks, etc. can vary, depending on circumstances.

The embodiments illustrated in the FIGS. each comprise quite many details. This may be the case in an actual embodiment of the present invention. However, it is also realized that the reason for the FIGS. being detailed is to illustrate several different aspects of the invention. Hence, embodiments of the invention may comprise only more limited number of details, as defined by the claims. For instance, the exhaust air heat exchanger 452 may or may not be used in combination with the other features shown in FIGS. 1*a*-1*d*.

In general, the above described embodiments and features of the present heat pump system 100 and methods are freely combinable, as applicable. For instance, one or several of the primary-side heat sources or sinks can be dynamically selected for exploitation of thermal energy as described above, while at the same time the compressor and expansion valve can be controlled dynamically so as to at all times meet an instantaneous required total heat pumping power and heat medium temperature for a currently used secondary-side application. This way, an optimal use of primary-side heat sources or sinks can be combined with a desired secondary-side energy use, in a way which functionally disconnects the primary side 400 from the secondary side 300 in the sense that these sides can be operated in a way in which one side is operated independently of the other so as to achieve the particular respective current operating goals.

Furthermore, what has been described above in relation to the system 100 according to the present invention is also freely applicable, correspondingly, to the method according to the present invention, and vice versa, as applicable.

Hence, the invention is not limited to the described embodiments, but can be varied within the scope of the enclosed claims.

The invention claimed is:

1. A heat pump system comprising at least one heat medium circuit in turn comprising
   a compressor,
   an expansion valve,
   at least two primary heat exchangers arranged to transfer thermal energy between a primary-side heat medium and at least one of two different primary heat sources or sinks selected from outdoor air, a natural water body, the ground or exhaust air,
   at least one secondary heat exchanger, arranged to transfer thermal energy between a secondary-side heat medium and at least one of two different secondary heat sources or sinks selected from indoors air, pool water, and tap water,
   a respective temperature sensor arranged to measure the temperature of each of said primary heat sources or sinks,
   a valve arranged to selectively direct the primary-side heat medium to at least one of said primary heat exchanger, and
   a control unit arranged to control said valve, controlling the valve including, in a secondary-side heating operating mode, measuring the temperature of said primary heat sources or sinks, and determining to direct the primary-side heat medium to one of: a) only the primary heat exchanger that is sufficiently warm so as to be able to heat, via heat exchange, at least one heat medium in the heat pump circuit to provide heat to at least one of said secondary heat sources or sinks and that is associated with the heat source or sink with the highest temperature, or b) to several of said primary heat exchangers that are sufficiently warm so as to be able to heat, via heat exchange, at least one heat medium in the heat pump circuit to provide heat to at least one of said secondary heat sources or sinks and that are associated with the respective heat sources or sinks with the highest temperatures, and control the valve to direct the primary-side heat medium to the determined one of a) or b); and
   wherein the control unit is arranged to, in the secondary-side heating operating mode, not direct the primary-side heat medium to all primary heat exchangers that are sufficiently warm so as to be able to heat, via heat exchange, at least one heat medium in the heat pump circuit to provide heat to at least one of said secondary heat sources or sinks, but only to a subset of the sufficiently warm primary heat exchangers.

2. The heat pump system according to claim 1, wherein the control unit is arranged to first evaluate which of the primary heat exchangers is or are available for providing heat to the heat pump circuit, and then to select to which of such available primary heat exchangers to direct the primary-side heat medium.

3. The heat pump system according to claim 1, wherein the control unit is arranged to first select to which primary heat exchanger or heat exchangers to direct the primary-side heat medium, and then to adjust a temperature of the heat pump circuit so as to be able to accept heat from the selected primary heat exchanger or heat exchangers.

4. The heat pump system according to claim 3, wherein the heat pump circuit comprises an inner loop heat medium circuit, in turn comprising the compressor, an expansion valve and an inner loop heat exchanger, which heat exchanger is arranged to thermally communicate with a primary-side heat medium circuit, in turn comprising said primary exchanger, and wherein the control unit is arranged to perform the adjustment of a temperature of the heat pump circuit by adjusting a temperature of the heat medium flowing through the inner loop heat exchanger.

5. The heat pump system according to claim 4, wherein the control unit is arranged to adjust said temperature of the heat medium flowing through the inner loop heat exchanger by adjusting the power of the compressor, the power of a separate pump and/or an opening of the expansion valve.

6. The heat pump system according to claim 1, the primary heat sources or sinks comprise at least one heat source or sink which is outdoors air and at least one heat source or sink which is the ground.

7. The heat pump system according to claim 1, the control unit is further arranged to, in a secondary-side cooling operating mode, control the valve to selectively direct the primary-side heat medium to only the primary heat exchanger associated with the heat source or sink with the lowest temperature.

8. The heat pump system according to claim 1, wherein the control unit is further arranged to, in a secondary-side cooling operating mode, control the valve to selectively direct primary-side heat medium to at least two of the primary heat exchangers associated with the respective heat sources or sinks with lower temperatures than a predetermined maximum temperature.

9. The heat pump system according to claim 1, wherein the control unit is further arranged to, in a secondary-side heating operating mode, control the valve to selectively direct the primary-side heat medium to only the primary heat exchanger associated with the heat source or sink with the highest temperature, apart from at least one of the at least two primary heat exchangers arranged to transfer thermal energy from exhaust air.

10. The heat pump system according to claim 1, wherein the control unit is further arranged to, in a secondary-side heating operating mode, control the valve to selectively direct primary-side heat medium to at least two of the primary heat exchangers associated with the respective heat sources or sinks with higher temperatures than a predetermined minimum temperature.

11. The heat pump system according to claim 1, wherein, in a heat recharging operation mode, the control unit is arranged to selectively inactivate the secondary heat exchanger, so that the primary-side heat medium flowing through the heat medium circuit substantially only interacts thermally with said at least two primary heat exchangers.

12. The heat pump system according to claim 11, wherein, when the secondary heat exchangers are inactivated, the control unit is arranged to inactivate the compressor and expansion valve, so that the primary-side heat medium does not thermally interact with the compressor nor the expansion valve.

13. The heat pump system according to claim 1, wherein respective valves are arranged to selectively direct the heat medium to at least two of said primary and secondary heat exchangers, wherein the control unit is arranged to control said valve, wherein the heat pump system comprises respective temperature sensors both upstream and downstream of at least one of said heat exchangers, wherein the control unit is arranged to, based upon temperature measurement values comprising at least one value read from said sensors, determine to what heat exchanger the heat medium is to be directed, and wherein when heat medium is not directed to a certain heat exchanger the control unit is arranged to read a measured temperature value upstream and downstream of the certain heat exchanger, to compare these values to each other and to set off an alert in case the values differ by more than a predetermined value.

14. The heat pump system according to claim 1, wherein the speed of the compressor can be controlled, wherein an opening of the expansion valve is adjustable, wherein the control unit is arranged to control the power of the heat pump system by controlling the speed of the compressor, and wherein the control unit is arranged to control an output temperature of heat medium flowing out from the expansion valve by controlling the opening of the expansion valve given the controlled speed of the compressor.

15. A method for controlling a heat pump system comprising a heat medium circuit in turn comprising:
a compressor,
an expansion valve,
at least two primary heat exchangers arranged to transfer thermal energy between a primary-side heat medium and at least one of two different primary heat sources or sinks selected from outdoor air, a natural water body or the ground,
at least one secondary heat exchanger arranged to transfer thermal energy between a secondary-side heat medium and at least one of two different secondary heat sources or sinks selected from indoors air, pool water, and tap water,
a respective temperature sensor arranged to measure the temperature of each of said primary heat sources or sinks,
a valve arranged to selectively direct the primary-side heat medium to at least one of said primary heat exchangers, and
a control unit arranged to control said valve,
wherein, in a secondary-side heating operating mode, the method comprises:
measuring the temperature of said secondary heat sources or sinks,
determining to direct the primary-side heat medium to one of: a only the primary heat exchanger that is sufficiently warm so as to be able to heat, via heat exchange, at least one heat medium in the heat pump circuit to provide heat to at least one of said secondary heat sources or sinks and that is associated with the heat source or sink with the highest temperature, or b) to several of said primary heat exchangers that are sufficiently warm so as to be able to heat, via heat exchange, at least one heat medium in the heat pump circuit to provide heat to at least one of said secondary heat sources or sinks and that are associated with the heat source or sink with the highest temperatures, and
controlling the valve to direct the primary-side heat medium to the determined one of a) or b); and
wherein the control unit, in the secondary-side heating operating mode, does not direct the primary-side heat medium to all primary heat exchangers that are sufficiently warm so as to be able to heat, via heat exchange, at least one heat medium in the heat pump circuit to provide heat to at least one of said secondary heat sources or sinks, but only a to subset of the sufficiently warm primary heat exchangers.

16. The method according to claim 15, wherein the method comprises the steps of the control unit first evaluating which primary heat exchangers are available for providing heat to the heat pump circuit, and then selecting to which of such available primary heat exchangers to direct the primary-side heat medium.

17. The method according to claim 15, wherein the method comprises the steps of the control unit first selecting to which primary heat exchanger to direct the primary-side heat medium, and then adjusting a temperature of the heat pump circuit so as to be able to accept heat from the selected primary heat exchanger.

18. The method according to claim 17, wherein the heat pump circuit comprises an inner loop heat medium circuit, in turn comprising the compressor, an expansion valve and an inner loop heat exchanger, which heat exchanger thermally communicates with a primary-side heat medium circuit, in turn comprising said primary exchanger, and wherein the control unit performs the adjustment of a temperature of the heat pump circuit by adjusting a temperature of the heat medium flowing through the inner loop heat exchanger.

19. The method according to claim 18, wherein the control unit adjusts said temperature of the heat medium flowing through the inner loop heat exchanger by adjusting the power of the compressor, the power of a separate pump and/or an opening of the expansion valve.

20. The method according to claim 15, wherein respective valves selectively direct the heat medium to at least two of said primary and secondary heat exchangers, wherein the control unit controls said valve, wherein the heat pump system is caused to comprise respective temperature sensors both upstream and downstream of at least one of said heat exchangers, wherein the method comprises a step in which the control unit reads temperature measurement values comprising at least one value read from said sensors and, based upon these values, determines to what heat exchanger the heat medium is to be directed, and wherein the method further comprises a step in which, when heat medium is not directed to a certain heat exchanger the control unit reads a measured temperature value upstream and downstream of the certain heat exchanger, compares these values to each other and sets off an alert in case the values differ by more than a predetermined value.

21. The method according to claim 15, wherein the speed of the compressor can be controlled, wherein an opening of the expansion valve is adjustable, wherein the control unit controls the power of the heat pump system by controlling the speed of the compressor, and wherein the control unit controls an output temperature of heat medium flowing out from the expansion valve by controlling the opening of the expansion valve given the controlled speed of the compressor.

* * * * *